(12) United States Patent
Tsushima et al.

(10) Patent No.: US 7,725,642 B2
(45) Date of Patent: May 25, 2010

(54) METHOD AND PROGRAM FOR PARTITIONING A PHYSICAL COMPUTER INTO LOGICAL PARTITIONS

(75) Inventors: Yuji Tsushima, Hachioji (JP); Toshiomi Moriki, Kunitachi (JP); Naoya Hattori, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 715 days.

(21) Appl. No.: 11/288,175

(22) Filed: Nov. 29, 2005

(65) Prior Publication Data

US 2006/0117130 A1      Jun. 1, 2006

(30) Foreign Application Priority Data

Nov. 30, 2004   (JP) .............................. 2004-345534

(51) Int. Cl.
  *G06F 12/00* (2006.01)
  *G06F 21/00* (2006.01)
(52) U.S. Cl. ......................................................... 711/6
(58) Field of Classification Search ........................ None
  See application file for complete search history.

(56) References Cited

U.S. PATENT DOCUMENTS

| 4,347,565 | A | * | 8/1982 | Kaneda et al. | .................. | 711/6 |
| 5,781,755 | A | * | 7/1998 | Uchino | ........................ | 718/100 |
| 6,397,242 | B1 | | 5/2002 | Devine et al. | | |

2004/0205272 A1 * 10/2004 Armstrong et al. .......... 710/260

FOREIGN PATENT DOCUMENTS

| JP | 61-292753 A | 12/1986 |
| JP | 08-305583 A | 11/1996 |

OTHER PUBLICATIONS

Rosenblum et al., Virtual Machine Monitors: Current Technology and Future Trends, May 2005, IEEE, 9 pages.*
Japanese Office Action dated Jun. 2, 2009 in corresponding Japanese Application No. 2004-345534.

* cited by examiner

*Primary Examiner*—Christian P Chace
*Assistant Examiner*—Gary W Cygiel
(74) *Attorney, Agent, or Firm*—Brundidge & Stanger, P.C.

(57) ABSTRACT

This invention provides a program product for a virtual computer that partitions a physical computer into a plurality of logical partitions through a hypervisor and runs an OS on each of the logical partitions, the program product including: a procedure (S1) of detecting an exception or an interruption occurring in the physical computer; a procedure (S2) of identifying an OS on a logical partition where the detected exception or interruption occurring; a procedure (S4) of copying a given storage area that contains an instruction that is the subject of the exception or interruption from a storage area where the identified OS is stored to a storage area that is managed by the hypervisor; a procedure (S6) of replacing, in the copied storage area, the exception or interruption subject instruction with an instruction that substitutes for the exception or interruption subject instruction; and a procedure (S7) of moving a location where the physical computer executes an instruction to the copied storage area.

18 Claims, 10 Drawing Sheets

METHOD AND PROGRAM FOR PARTITIONING A PHYSICAL COMPUTER INTO LOGICAL PARTITIONS

CLAIM OF PRIORITY

The present application claims priority from Japanese application P2004-345534 filed on Nov. 30, 2004, the content of which is hereby incorporated by reference into this application.

BACKGROUND

This invention relates to a virtual computer system and to a technique of processing a virtual computer system to deal with a privileged operation exception and an interruption occurring in OSs that are executed separately in a plurality of logical partitions.

The popularization of the use of the Internet and broadband networks in business has brought an increase in requests for improved processing performance of information systems that support business. To meet the requests for improved processing performance, an information system employs a plurality of servers (computers) in processing information. Obtaining more improved processing performance means employing more servers, and some information systems are as large as having several thousands to ten thousands of servers. The cost of running and managing such large-scale information systems, especially the cost for maintenance of their servers, rises in proportion to the count of the servers employed.

Server consolidation, in which the server count is decreased by employing a few high-performance servers that take over processing formerly performed by a plurality of servers, is attracting attention as a way to keep the running and managing cost from increasing. An architecture known to be capable of achieving such server consolidation is a virtual computer system utilizing logical partitioning in which one hardware resource is partitioned into a plurality of logical partitions and each of the logical partitions is provided with an OS to serve as a server (see U.S. Pat. No. 6,397,242, for example). Logical partitioning is characterized by sharing a CPU among a plurality of logical partitions, thereby raising the operating ratio of the CPU and efficiently achieving server consolidation.

In the example of prior art provided by U.S. Pat. No. 6,397,242, server consolidation is achieved by executing one host OS on one server and running a plurality of guest OSs on the host OS to use each of the guest OSs as a server.

SUMMARY

The logical partitioning described above needs to keep the operation of one logical partition from influencing the operation of another logical partition. In order to prevent a guest OS running on one logical partition from influencing another logical partition, the guest OSs are put in a non-privilege status or set to low-privilege levels, and thus have a limited use of privileged instructions directed to the CPU.

However, an instruction string of a guest OS contains an instruction that cannot operate normally when operated in a non-privilege status or on a low-privilege level (this type of instruction is referred to as privileged instruction, examples thereof are page fault and instruction TLB miss). In general, executing a privileged instruction in a non-privilege status or on a low-privilege level induces error of privileged operation exception, which affects the host OS and other logical partitions.

The prior art example according to U.S. Pat. No. 6,397,242 deals with a privileged instruction in an instruction string of a guest OS by providing, in an intermediate layer between the host OS and a guest OS, a virtual computer monitor, which interprets an instruction string of the guest OS. The virtual computer monitor performs, when there is a privileged instruction in the instruction string, binary translation to make over the privileged instruction into a new instruction string. The virtual computer monitor then decides whether to use the result of the binary translation (the new instruction string) or to directly execute the instruction string of the guest OS, and has the CPU execute the chosen one.

A problem of the prior art example of U.S. Pat. No. 6,397,242, where detection of a privileged instruction in an instruction string of a guest OS is followed by creation of a new instruction string through binary translation and then by selection between the instruction string of the guest OS and the new instruction string, is in that the presence of a privileged instruction in an instruction string of a guest OS necessitates processing of selecting between the result of binary translation and the instruction string of the guest OS upon execution of the guest OS, and in that the selection processing leads to an overhead of the guest OS and could lower the performance of the guest OS. In addition, when there is a privileged instruction in an instruction string of a guest OS and it is decided as a result of the selection processing that the CPU is to directly execute the instruction string of the guest OS, the binary translation and the selection processing end up being an waste which directly leads to an overhead.

This invention has been made in view of the above problems, and it is therefore an object of this invention to provide a virtual computer system capable of keeping an OS that is running on a logical partition and experiences an exception or an interruption from influencing another logical partition while suppressing an overhead.

This invention provides a program product for a virtual computer that partitions a physical computer into a plurality of logical partitions through a hypervisor and runs an OS on each of the logical partitions, and the program product includes the procedures of: detecting an exception or an interruption in the physical computer; identifying an OS on a logical partition where the detected exception or interruption has occurred; copying a given storage area that contains an instruction that is the subject of the exception or interruption from a storage area where the identified OS is stored to a storage area that is managed by the hypervisor; replacing, in the copied storage area, the exception or interruption subject instruction with an instruction that substitutes for the exception or interruption subject instruction; and moving a location where the physical computer executes an instruction to the copied storage area, and is characterized in that the hypervisor carries out the detected exception or interruption in place of the OS on the logical partition where the exception or interruption has occurred.

When an exception or an interruption occurs, this invention replaces an instruction that is the subject of the exception or interruption with a substitute instruction (emulator) and has the hypervisor process the instruction, thereby avoiding another privileged operation exception and enhancing the processing speed of the virtual computer.

The hypervisor merely replaces an instruction that is the subject of the exception or interruption with a substitute instruction (emulator). Unlike the prior art example, there is no need for binary translation, nor the subsequent selection of which instruction is to be executed. This invention therefore has a remarkable effect of greatly cutting an overhead of exception/interruption processing and enhancing the processing speed of the virtual computer.

DETAILED DESCRIPTION OF THE PREFERRED EMBODIMENTS

Embodiments of this invention will be described below with reference to the accompanying drawings.

Figure 1:
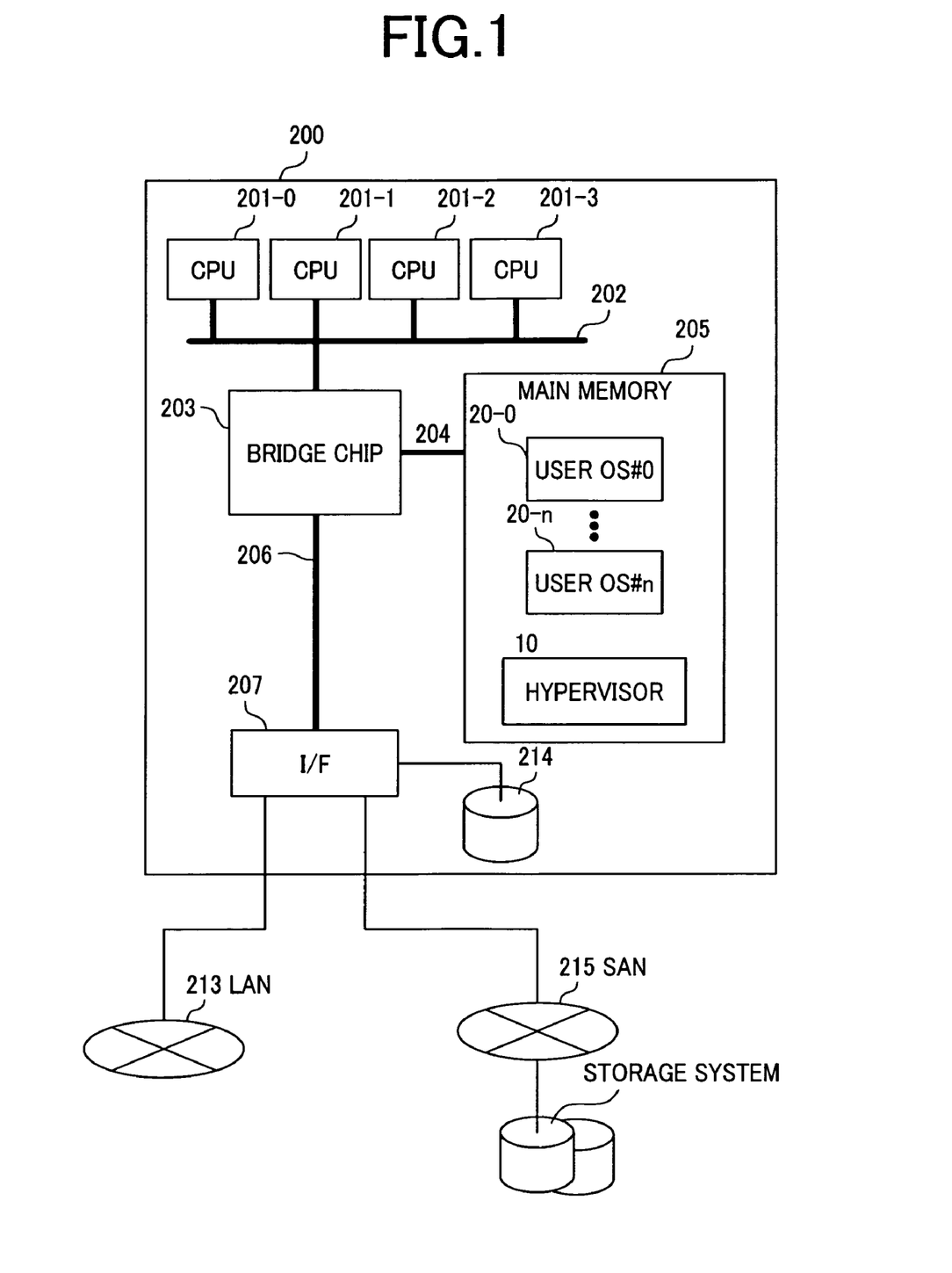
FIG. 1 is a block diagram showing a hardware configuration of a physical computer that embodies a virtual computer system according to a first embodiment of this invention.

FIG. 1 shows a configuration of a physical computer 200 on which a virtual computer system according to a first embodiment of this invention is run.

The physical computer 200 has a plurality of (four) CPUs 201-0 to 201-3, which are connected to a bridge (or a memory controller or a chip set) 203 via a front-side bus 202.

To the bridge 203, a memory (main memory) 205 is connected via a memory bus 204, and an I/O interface 207 is connected via a bus 206. The I/O interface 207 is connected to I/O devices including, for example, a network adapter (not shown) connected to a LAN 213, a disk drive 214, a Fibre Channel adapter (not shown) connected to a SAN (Storage Area Network) 215, and a display (not shown).

The CPUs 201-0 to 201-3 access the memory 205 and the I/O interface 207 via the bridge 203 to perform given processing.

The physical computer 200 may be made up of either a single CPU or two or more CPUs. Similarly, each CPU may be constituted of either a single core or a plurality of cores.

A detailed description will be given with reference to FIG. 2 on software that develops a virtual computer on the physical computer 200.

Figure 2:
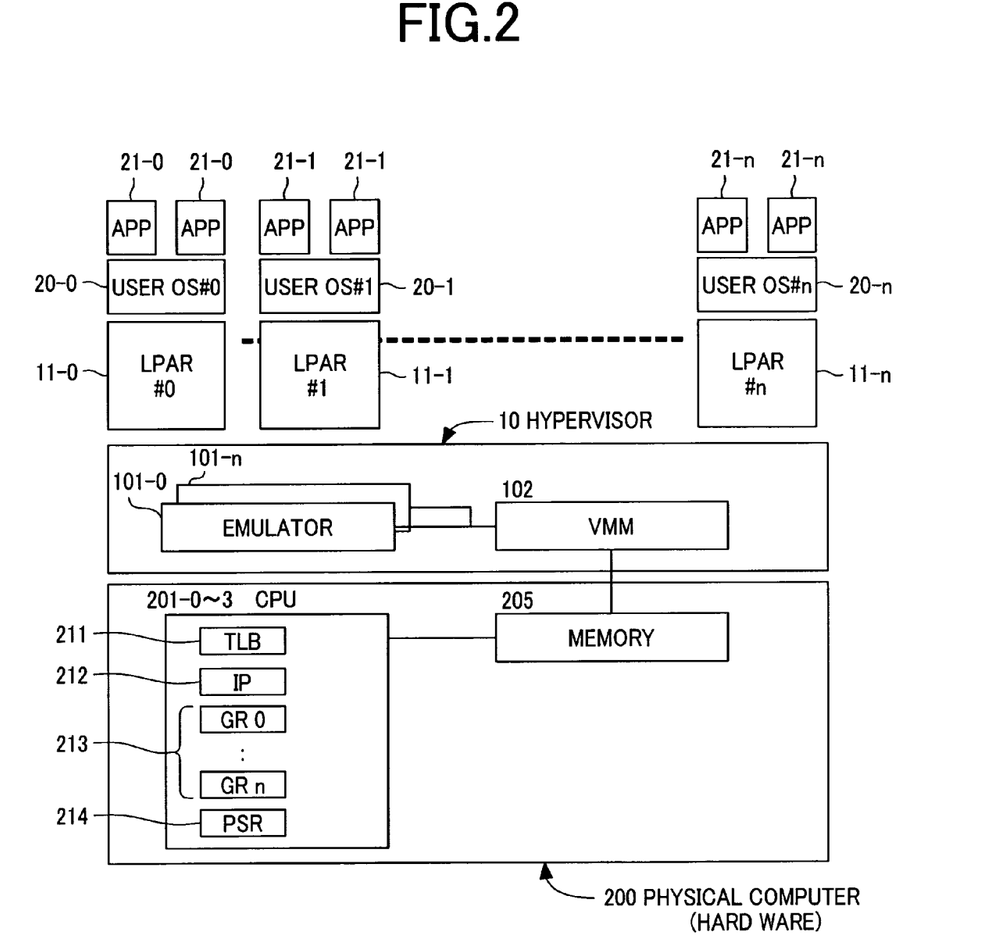
FIG. 2 is a block diagram showing a software configuration of the virtual computer system according to the first embodiment.

In FIG. 2, a hypervisor (firmware or middleware) 10, which logically partitions a hardware resource (computer resource) and manages the resultant logical partitions (LPAR: Logical PARtition), is run on the physical computer 200. The hypervisor 10 is control software that partitions a hardware resource of the physical computer 200 into a plurality of logical partitions (LPARs) and manages allocation of the computer's resource.

The hypervisor 10 partitions a computer resource of the physical computer 200 into LPAR#0 to LPAR#n (denoted by 11-0 to 11-$n$ in FIG. 2), which are logical partitions provided to users. OS#0 to OS#n (denoted by 20-0 to 20-$n$ in FIG. 2) used by users (hereinafter referred to as user OS) are run respectively on LPAR#0 to LPAR#n, and user applications 21-1 to 21-$n$ are executed respectively on User OS#0 to User OS#n. LPAR#0 to LPAR#n are set by an administrator or the like who gives instructions to the hypervisor 10 through a console (not shown) or the like.

The hypervisor 10 makes User OS#0 to User OS#n assigned to LPAR#0 to LPAR#n share a hardware resource (a resource of the physical computer 20Q). This embodiment shows a case in which a hardware resource containing a plurality of CPUs 201-0 to 201-$n$ is shared among the User OS#0 to User OS#n on the plurality of logical partitions LPAR#0 to LPAR#n.

The hypervisor 10 contains emulators 101 (denoted by 101-0 to 101-$n$ in FIG. 2) and a VMM (Virtual Memory Manager) 102. The emulators 101 interpret instruction strings of User OS#0 to User OS#n and, in the event of a privileged operation exception (or interruption), which will be described later, replace the related privileged instruction to execute its replacement instruction. The VMM 102 converts a physical address space of the memory 205 (or the disk drive 214) in the physical computer 200 into a continuous virtual address (or logical address) space to allocate the virtual address space to LPAR#0 to LPAR#n.

The CPUs 201-0 to 201-3 each have various registers and buffers. Examples of those registers and buffers are as follows.

An instruction TLB (Translation Lookaside Buffer) 211: a buffer that caches results of virtual address-physical address conversion in regard of instructions and sends a physical address that corresponds to a virtual address in the instruction TLB in response to an inquiry. Though not shown in FIG. 2, the CPUs may have a data TLB, which caches result of virtual address-physical address conversion in regard of data.

An IP (Instruction Pointer) 212: a register that counts an instruction execution location (virtual address).

A general register 213: a register that is constituted of a plurality of registers GR0 to GRn, and can be utilized by User OS#0 to User OS#n and the applications 21-0 to 21-$n$.

A PSR (Processor Status Register) 214: a register that sets flags indicating the status of the CPU.

Other than the ones listed above, an application register, a control register (CR), and the like are provided in each CPU.

In order to control access to a hardware resource or a software resource, the CPUs 201-0 to 201-3 set a privilege level based on, e.g., the virtual address of an instruction to be executed. For instance, there can be four privilege levels of from 0 to 3, with Level Zero being the highest privilege level and Level Three being the lowest privilege level. On Privilege Level Zero, the PSR 24 can be accessed whereas access to the PSR 24 is denied on Privilege Level 3 and privileged operation exception occurs.

The hypervisor 10 assigns a non-privilege status or a low-privilege level (e.g., Privilege Level 3) to User OS#0 to User OS#n. The hypervisor 10 assigns the highest privilege level, i.e., Level Zero, to itself so that it can freely access a hardware resource or a software resource and make the plurality of user OSs, i.e., User OS#0 to User OS#n, share the physical computer 200. By assigning a low privilege level to User OS#0 to User OS#n, the hypervisor 10 prevents User OS#0 to User OS#n from directly operating a hardware resource (e.g., a register of the CPUs) or other resources. The hypervisor 10 thus avoids such situations as one where a user OS changes settings of a hardware resource in a manner that hinders another user OS from working normally and one where a failure in a user OS propagates to another user OS.

Figure 3:
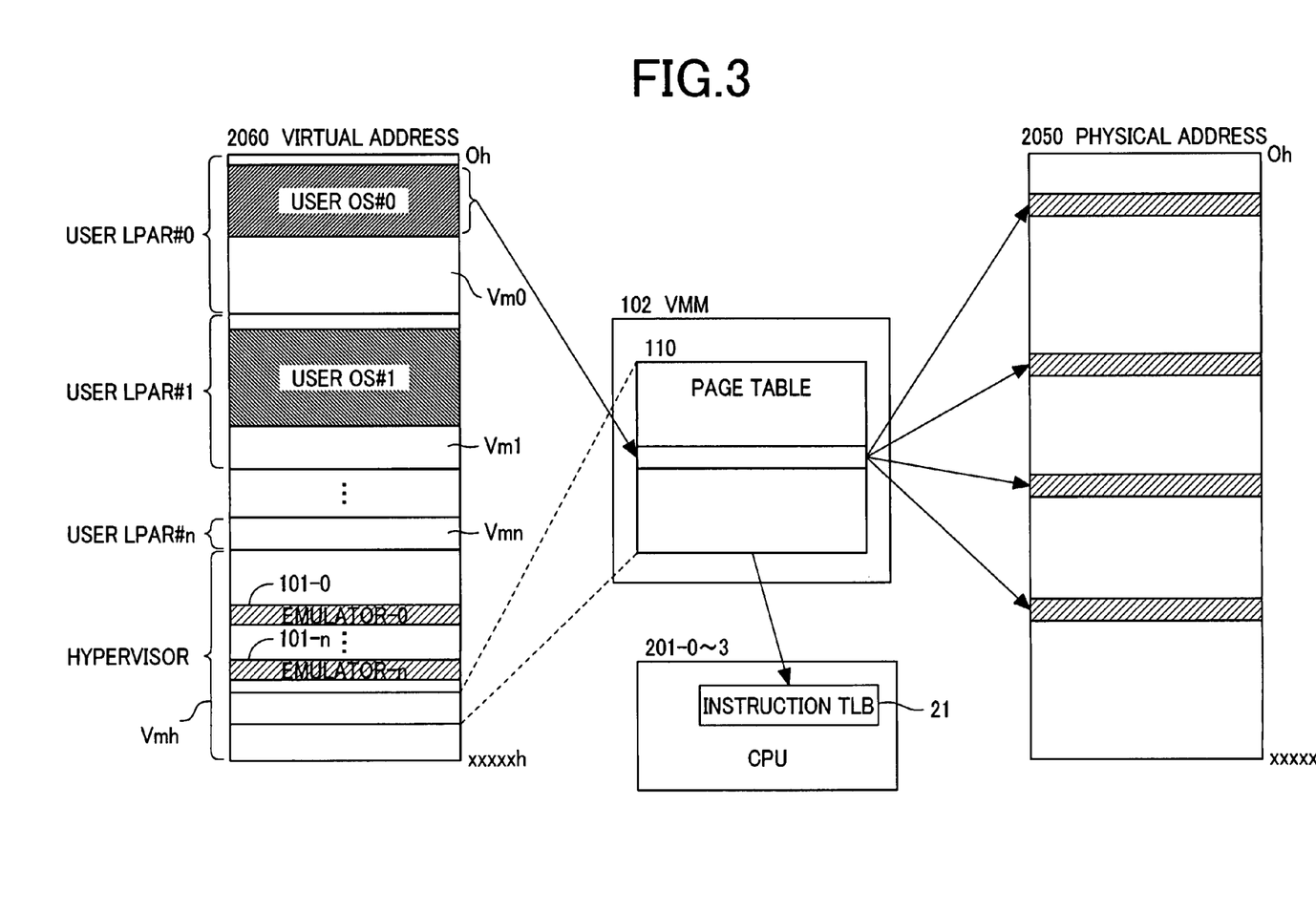
FIG. 3 is a map showing the relation between a virtual address space and a physical address space.

FIG. 3 shows the relation between a virtual address space and a physical address space.

The VMM 102 of the hypervisor 10 has, as shown in FIG. 3, a page table 110, which is used to convert a physical address space 2050 into a continuous virtual address space 2060. The page table 110 manages the association relation between the virtual address space 2060 and the physical address space 2050 with a preset page size (e.g., 4 K bytes) as a unit.

For instance, as shown in FIG. 3, the virtual address space 2060 is divided into a plurality of virtual storage areas Vm0 to Vmn and Vmh that have consecutive virtual addresses to assign the virtual storage area Vm0 to LPAR#0, the virtual storage area Vm1 to LPAR#1, and the virtual storage area Vmn to LPAR#n, and the virtual storage area Vmh is assigned as an area used by the hypervisor 10. In FIG. 3, the virtual storage area Vm0 stores User OS#0, the virtual storage area Vm1 stores User OS#1, and the virtual storage area Vmh serves as a hypervisor's allocated area (an area used by the hypervisor 10).

The page table 110 is stored in the virtual storage area Vmh where the hypervisor 10 uses the emulators 101-0 to 101-n, which will be described later, or a work area.

The VMM 102 receives an access request from User OS#0 to User OS#n, and searches the page table 110 for a physical address that corresponds to a virtual address contained in the access request. Then the VMM 102 accesses the memory at the physical address found, and sends the result of the access to User OS#0 to User OS#n. While a virtual storage area is constituted of consecutive virtual addresses, physical addresses associated with the virtual addresses are often inconsecutive. For instance, in FIG. 3, the virtual storage area Vm0, which stores User OS#0 and which is constituted of consecutive addresses in the virtual address space 2060, is spread over four blocks in the physical address space 2050 to be discontinuous. Accordingly, setting a virtual address to the instruction pointer IP 22 leads to successive access in the virtual address space.

The CPUs 201-0 to 201-3 each have, as shown in FIG. 2, the TLB 211 which caches the page table 110, and are thus capable of high-speed conversion between a virtual address and a physical address once the addresses are accessed.

Next, the relation between User OS#0 to User OS#n and privilege levels will be described.

As mentioned above, the hypervisor 10 assigns a non-privilege status or a low-privilege level to User OS#0 to User OS#n, to thereby prevent User OS#0 to User OS#n from operating a hardware resource or other resources directly and prevent a failure in one user OS from propagating to another user OS.

However, instruction strings of User OS#0 to User OS#n sometimes contain an instruction that cannot be executed on any other privilege levels than Privilege Level Zero (privileged instruction). An attempt to execute a privileged instruction by User OS#0 to User OS#n, to which a non-privilege status or a low-privilege level is assigned, causes a privileged operation exception.

The hypervisor 10 of this embodiment deals with this matter by, when User OS#0 to User OS#n are about to execute a privileged instruction, having the emulators 101 (the emulators 101-0 to 101-n of FIG. 3) replace a privileged instruction with another instruction (e.g., a CALL instruction of the emulators 101), which is then executed by the CPUs 201-0 to 201-3. The emulators 101 are, as shown in FIG. 3, set in the hypervisor's allocated area Vmh out of the virtual storage areas, and the emulators 101-0 to 101-n are assigned to User OS#0 to User OS#n, respectively. In other words, a privileged instruction of User OS#0 is processed by the emulator 101-0, and a privileged instruction of User OS#1 is processed by the emulator 101-1. This means that each of the emulators 101-0 to 101-n is independent of other user OSs (LPARs) than its assigned one, thus avoiding a disorder in variables for concurrent processing of privileged instructions or the like. In the following description, "emulator 101" is used as the generic term of the emulators whereas suffixes "-0" to "-n" are added to "101" when referring to the individual emulators assigned to the respective user OSs.

The emulators 101-0 to 101-n may be stored in advance in the hypervisor's allocated area Vmh, which is a virtual storage area. Alternatively, the hypervisor 10 may create, each time a user OS tries to execute a privileged instruction, the emulator 101 that is associated with this user OS in the hypervisor's allocated area Vmh. Described below is a case in which the emulators 101-0 to 101-n associated with User OS#0 to User OS#n, respectively, are stored in the hypervisor's allocated area Vmh in advance as shown in FIG. 3.

Figure 4:
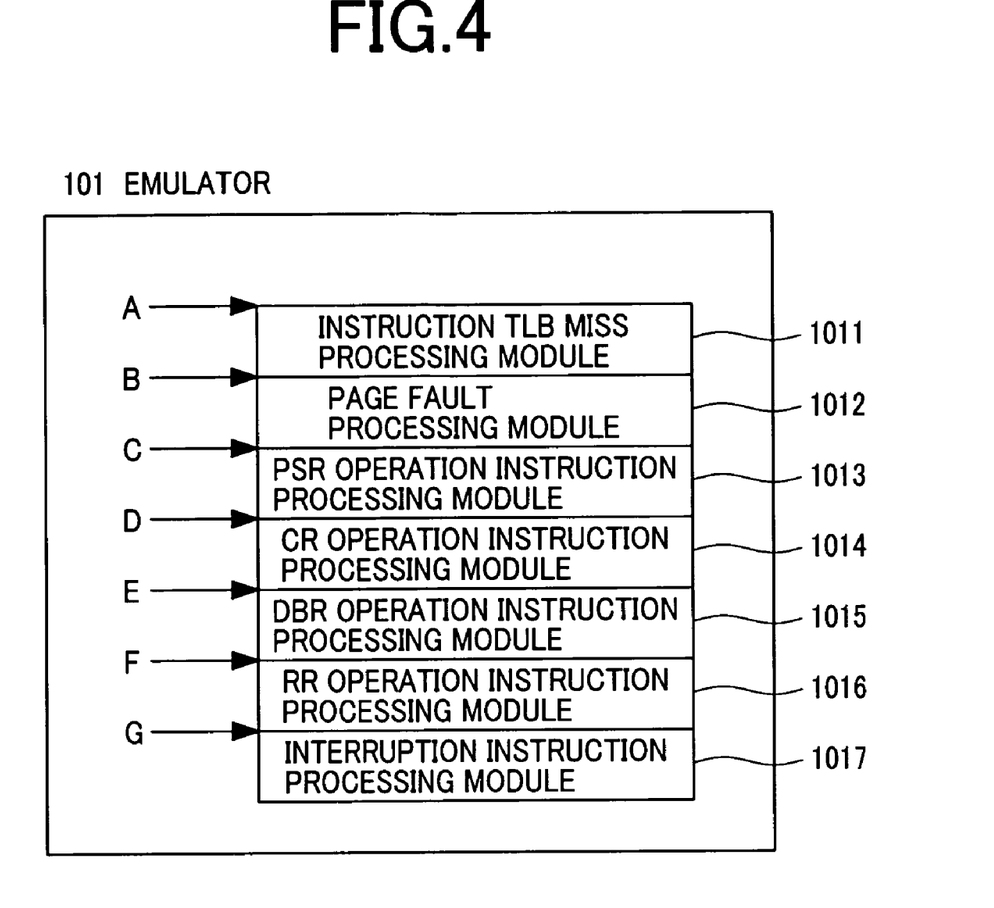
FIG. 4 is a block diagram showing an example of an emulator.

The emulator 101 has, as shown in FIG. 4, as many processing modules as the number of types of privileged instruction and a processing module to process interruption. Different calling addresses A to G of the emulator 101 are used to activate different processing modules. The hypervisor 10 sets, as calling addresses of the emulator 10, addresses reflecting the types of privileged operation exception and interruption instruction, and uses the set addresses to call up the emulator 101.

For example, the calling address A is used to activate an instruction TLB miss processing module 1011. The instruction TLB miss processing module 1011 follows a preset procedure to execute processing for dealing with a case where the instruction TLB fails to hit which is one of privileged operation exceptions. The calling address B is used to activate a Page Fault processing module 1012, and the Page Fault processing module 1012 follows a preset procedure to execute processing for dealing with page fault which is one of privileged operation exceptions. The calling address C is used to activate a PSR (Processor Status Register) processing module 1013, and the PSR processing module 1013 follows a preset procedure to execute processing for emulating operation of the RSR 24 which is one of privileged operation exceptions.

The calling addresses D to F are for activation of processing for emulating operation of the registers in the CPU that are operable only on a privilege level as is the PSR 24. For example, the calling address D is used to activate a CR (Control Register) processing module 1014, which performs processing of emulating operation of the control register provided to manage addresses of the page table, interruption addresses, and the like. The calling address E is used to activate a DBR (Debug Brakepoint Register) processing module 1015, which performs processing of emulating operation of a debug breakpoint register provided to manage debug operation. The calling address F is used to activate an RR (Region Register) processing module 1016, which performs processing of emulating operation of a region register provided to search for the instruction TLB.

The calling address G is used to activate an interruption processing module 1017, which performs processing of emulating a preset interruption instruction.

The hypervisor 10 sets in advance the user OS to be emulated as well as the instruction to be emulated, and calls up the emulator 101 when the emulation conditions are met. One way to set the user OS to be emulated is attaching a flag in advance to the chosen user OS in the page table 110 (or the VMM 102).

The procedure that the hypervisor 10 follows in activating the emulator 101 will be described next with reference to a flow chart of FIG. 5.

Figure 5:
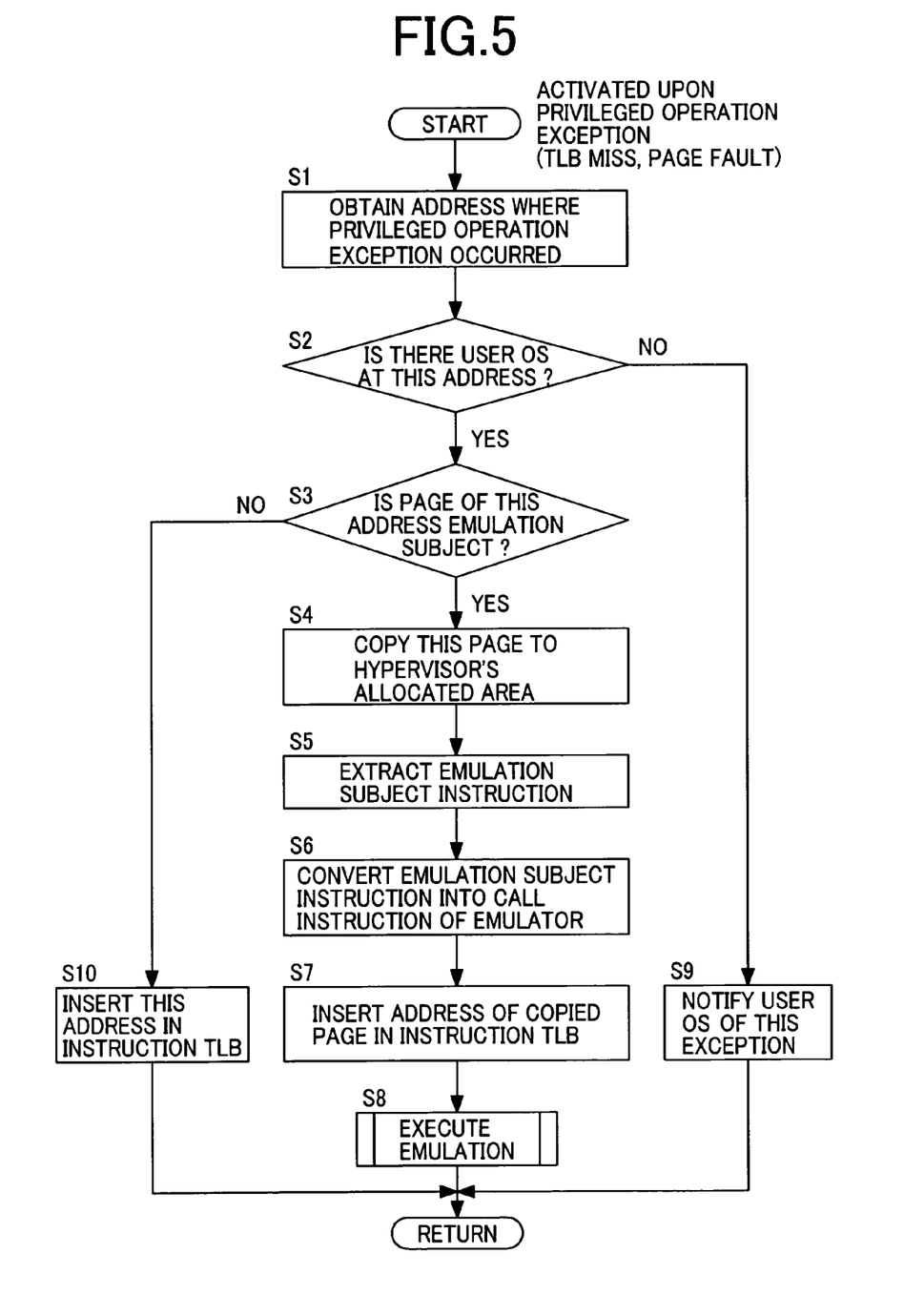
FIG. 5 is a flow chart showing an example of emulation processing that is executed by a hypervisor according to the first embodiment.

FIG. 5 shows an example of emulation processing executed by the hypervisor 10 upon occurrence of a privileged operation exception such as instruction TLB miss and page fault. The hypervisor 10 has a function of detecting preset exceptions and interruptions in order to distribute a hardware resource among the LPARs and share the hardware resource among User OS#0 to User OS#n on the LPARs as described above.

Detecting a privileged operation exception that is preset, the hypervisor 10 obtains in a step S1 a virtual address where the privileged operation exception has occurred. In the case where the hypervisor 10 receives a physical address where the privileged operation exception has occurred from the CPUs 201-0 to 201-3 or from others, the received physical address is converted into a virtual address based on the page table 110.

In a step S2, the hypervisor 10 consults the page table 110 to judge whether or not there is a user OS at the virtual address obtained in the step S1. When there is a user OS at this address in the virtual address space managed by the hypervisor 10, the processing moves to a step S3. When there is no user OS at the address, the processing moves to a step S9. In the step S9, the hypervisor 10 notifies User OS#0 to User OS#n of the occurrence of the privileged operation exception, and then ends the processing.

In the step S3, the hypervisor 10 judges whether or not the virtual address where a user OS is located has been set as a subject of emulation to be performed by the emulator 101. When the virtual address where the privileged operation exception has occurred is an emulation subject, the processing moves to a step S4. When the virtual address is not an emulation subject, the processing moves to a step S10. In the step S10, the hypervisor 10 sets the address where the privileged operation exception has occurred to the TLB 211 and executes the TLB 211 instead of performing emulation.

In the step S4, the hypervisor 10 executes emulation of the detected privileged operation exception in place of the related user OS.

The hypervisor 10 searches the page table 110 for the page that contains the virtual address where the privileged operation exception has occurred, and copies this page to a free area within the hypervisor's allocated area Vmh.

In a step S5, the hypervisor 10 searches an instruction string on the page copied to the hypervisor's allocated area Vmh, and extracts an instruction that is set in advance as an emulation subject. The extraction of an emulation subject instruction is performed, for example, by presetting a table of binary codes representing emulation subject instructions and then checking instructions at the address in question on the copied page against the table.

In a step S6, the hypervisor 10 sets a calling address inside the emulator 101 in association with the extracted instruction, and sets this address as a called address of the emulator 101. The calling address is one chosen as suitable for the extracted emulation subject instruction out of the calling addresses A to G varied to reflect different types of instruction as shown in FIG. 4.

Since the emulators 101-0 to 101-n are assigned to User OS#0 to User OS#n, respectively, as shown in FIG. 3, a called address of the emulators 101-0 to 101-n is made up of the address of the emulator 101 that is assigned to the user OS to be emulated with one of the calling addresses A to G inside this emulator 101 being taken into consideration.

When it is determined which of the emulators 101-0 to 101-n to call up, the hypervisor 10 replaces the emulation subject instruction on the page copied to the hypervisor's allocated area Vmh with a CALL instruction of the emulators 101-0 to 101-n.

In a step S7, the hypervisor 10 sets the physical address of the emulation subject page copied to the hypervisor's allocated area Vmh to the instruction TLB 211 in a manner described below in order to have the CPUs 201-0 to 201-3 execute this page.

In a step S8, the emulation subject page set to the instruction TLB 211 is executed, and the emulators 101-0 to 101-n have the CPUs 201-0 to 201-3 execute the privileged operation exception instruction in place of the user OS. The emulators 101-0 to 101-n respectively send back the result of executing the instruction to their assigned User OS#0 to User OS#n.

As the emulation is finished, the hypervisor 10 returns the control to User OS#0 to User OS#n that originally held the control. For instance, a page next to the copied page of User OS#0 to User OS#n is set in the instruction TLB 211, and the instruction execution location is moved back to User OS#0 to User OS#n.

Through the above processing, the hypervisor 10 processes a privileged operation exception instruction in place of User OS#0 to User OS#n by having the emulators 101-0 to 101-n copy a page of User OS#0 to User OS#n that contains the emulation subject instruction to the hypervisor's allocated area Vmh, replacing the emulation subject instruction with a given instruction, and then executing the replacement instruction.

Although FIG. 5 illustrates a case of dealing with an occurrence of a privileged operation exception, the hypervisor 10 detects interruptions as well as privileged operation exceptions. An interruption in User OS#0 to User OS#n can be dealt with the same way as the privilege exception described above, and the emulators 101-0 to 101-n execute an instruction that replaces an interruption instruction.

A specific example of the case of dealing with an occurrence of a privileged operation exception which is illustrated in FIG. 5 will be described next with reference to FIG. 6.

Figure 6:
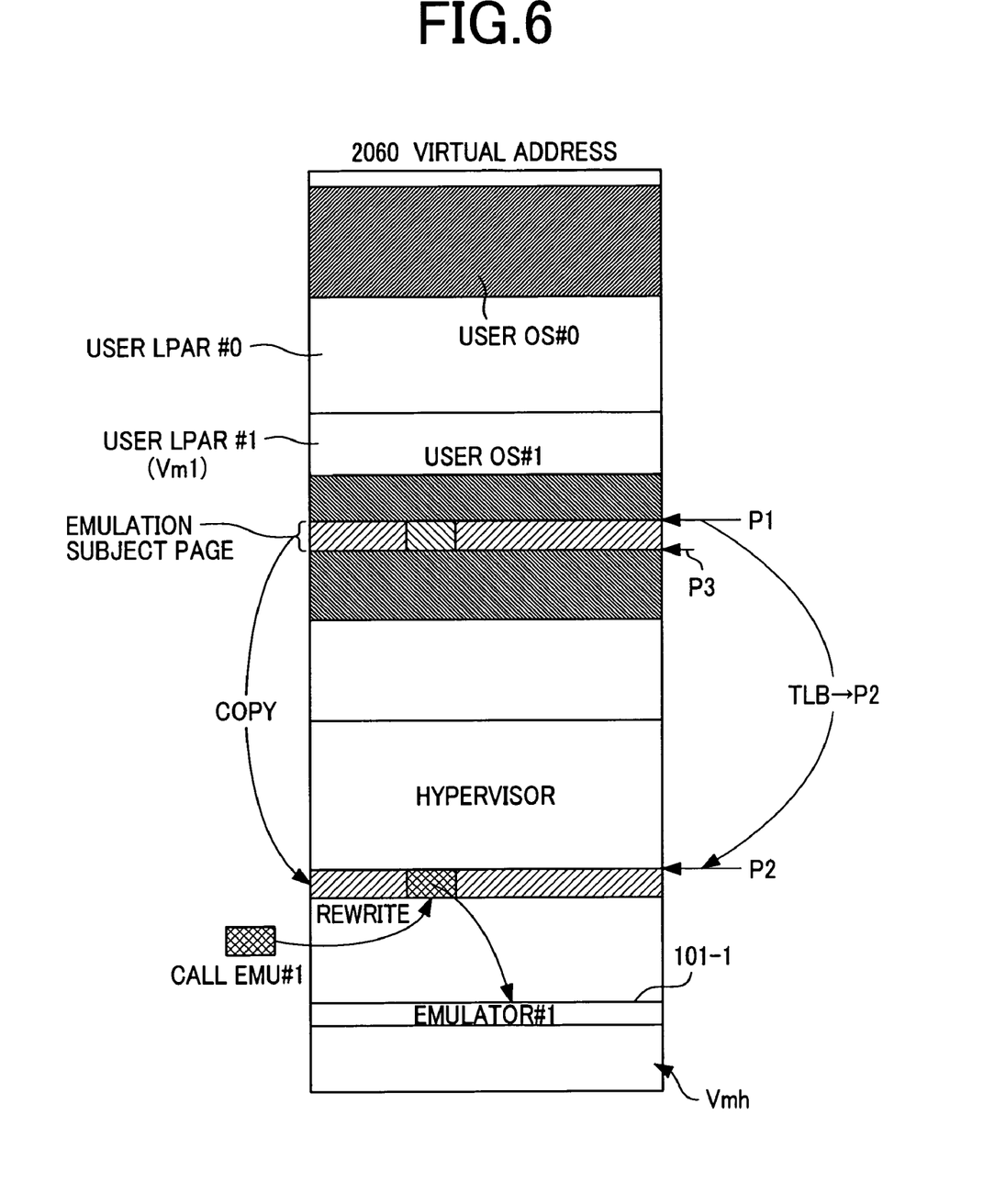
FIG. 6 is a virtual address space map showing how the emulation processing is executed.

FIG. 6 is a virtual address space map showing how the hypervisor 10 operates when a privileged operation exception occurs in User OS# 1 on LPAR#1 which is shown in FIG. 3.

In this example, User OS#1 is executed in a non-privilege status or on a low-privilege level, and an instruction to operate the PSR 214 (hereinafter referred to as PSR operation instruction) is found in an instruction string of User OS#1. The PSR operation instruction cannot be executed on any other privilege levels than Level Zero, and therefore the CPUs 201-0 to 201-3 notifies the hypervisor 10 of a privileged operation exception.

The hypervisor 10 consults the page table 110 to determine the virtual address at which the privileged operation exception has occurred, and identifies User OS# 1 as the user OS to which the privileged operation exception instruction belongs. Judging that User OS# 1 is an emulation subject, the hypervisor 10 copies, to a free area within the hypervisor's allocated area Vmh, one page containing the virtual address where the privileged operation exception has occurred.

In FIG. 6, P1 is given as the head address of the page containing the virtual address where the privileged operation exception has occurred, and a given range (e.g., 4 kB) of area which begins at this head address and which corresponds to one page is copied to a virtual address P2 in the hypervisor's allocated area Vmh.

The hypervisor 10 then searches the portion of User OS#1 that has been copied to the virtual address P2 to extract the privileged operation exception instruction. To extract the privileged operation exception instruction, a post-copy address in the hypervisor's allocated area Vmh that corresponds to the virtual address obtained in the step S1 is read, instructions at the read address are compared against a preset list of emulation subject instructions, and an instruction that is found on the list of emulation subject instructions is extracted. The hypervisor 10 here extracts the above PSR operation instruction.

The hypervisor 10 chooses a calling address that is associated with the extracted PSR operation instruction from calling addresses of the emulator 101-1, which is assigned to User OS#1 and is set advance in the hypervisor's allocated area Vmh. When the emulator 101-1 is configured as shown in FIG. 4, for example, a calling address of the emulator 101-1 that is associated with a PSR operation instruction is C. Accordingly, the hypervisor 10 sets an address made up of the virtual address of the emulator 101-1 with the calling address C being taken into consideration as a called address of the emulator 101-1.

Then, in the area copied to the virtual address P2, the hypervisor 10 rewrites the privileged operation exception instruction into a CALL instruction of the emulator 101-1.

The hypervisor 10 next changes the current settings of the instruction TLB 211 which points to the page P1 on LPAR#1 such that the virtual address P2 in the hypervisor's allocated area Vmh where a copy of the page is located is designated, and thus switches in which part of the virtual address space an instruction is executed.

Figure 7A:
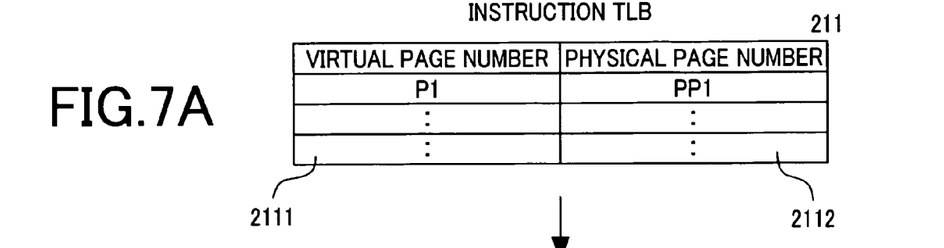
FIGS. 7A and 7B are explanatory diagrams of instruction TLBs to show how the emulation processing is executed, with FIG. 7A showing an instruction TLB of when a page in question is copied and FIG. 7B showing an instruction TLB of when the emulation is started.
Figure 7B:
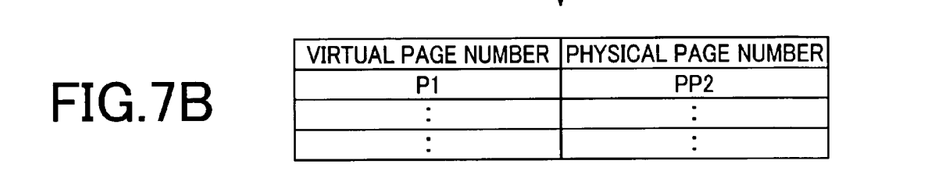

The instruction TLB 211, which designates a page of an instruction to be executed, contains an area where a virtual address is stored (a virtual address area 2111), and an area where a physical address that corresponds to the stored virtual address is stored (physical address area 2112) as shown in FIGS. 7A and 7B. At the time the hypervisor 10 finishes copying the page of the virtual address P1, a physical address PP1, which corresponds to the virtual address P1, is stored in the physical address area 2112 as shown in FIG. 7A.

After copying the emulation subject page to the virtual address P2, choosing a calling address, and replacing the emulation subject instruction with a CALL instruction of the emulator 101-1, the hypervisor 10 changes the instruction TLB 211 such that a physical address PP2, which corresponds to the post-copy virtual address P2, is stored in the physical address area 2112 instead of the physical address PP1, which corresponds to the virtual address P1.

In the case where the control register CR manages a pointer (Page Table Address) of the page table 110, a register value representing the pointer is rewritten into a value that corresponds to the physical address PP2.

The hypervisor 10 then has the CPUs 201-0 to 201-3 execute processing on the copied page starting at the virtual address P2. The CPUs 201-0 to 201-3 sequentially execute instructions in the instruction string on the page copied to the virtual address P2, and thus the privileged operation exception instruction can be substituted by the CALL instruction of the emulator 101-1.

In this manner, the hypervisor 10 copies one portion of pages of User OS# 1 where a privileged operation exception has occurred to an area managed by the hypervisor 10, replaces the emulation subject instruction with a CALL instruction of the emulator 101-1, and executes the privileged instruction in place of User OS# 1.

Completion of execution of the emulation 101-1 is a signal to the hypervisor 10 to operate the instruction TLB 211 in the manner described above and set the instruction execution location (virtual address) to P3, which is the next page to the original page copied from User OS#1 in FIG. 6. Execution of User OS# 1 is now resumed.

Figure 8:
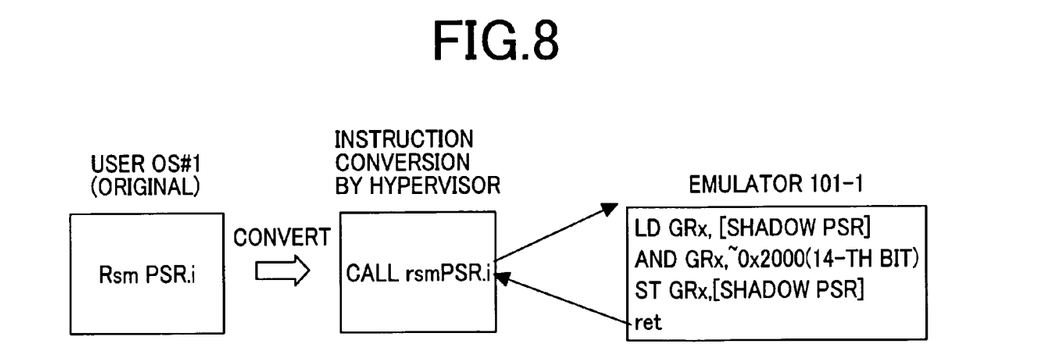
FIG. 8 is an explanatory diagram showing an example of the emulation processing for emulating a PSR operation instruction.

To give an example of the operation of the emulator 101-1, the emulator 101-1 operates as shown in FIG. 8 in the case where the privileged operation exception instruction of User OS#1 is an instruction to set an interruption prohibition to the PSR 211 (Rsm PSR, i). FIG. 8 shows how an instruction is converted when an instruction extracted from User OS#1 is executed by the emulator 101-1.

First, the hypervisor 10 extracts, from the copied page (P2), the instruction that sets an interruption prohibition to the PSR 211 (Rsm PSR, i). Next, this PSR operation instruction is rewritten into a CALL instruction to call up the PSR instruction processing module (denoted by 1013 in FIG. 4) of the emulator 101-1. Then the emulator 101-1 is executed.

In the case of an interruption prohibition instruction, handing the instruction of User OS#1 as it is over to the CPU prevents other user OSs from accepting an interruption. To avoid this, the emulator uses an environmental variable Shadow PSR, which is prepared for each of User OS#0 to User OS#n, as a substitute for a physical register. User OS#0 to User OS#n each use the environmental variable Shadow PRS as a PSR.

The emulator 101-1 performs the following processing.

LD GRx, [Shadow PSR]: the environmental variable Shadow PSR is read onto the general register GRx.

AND GRx, ~0x2000: a logical product of the environmental variable Shadow PSR in the general register GRx and a given value is calculated (~0x2000 represents bit-inverted 0x2000).

ST GRx, [Shadow PSR]: a calculation result of the environmental variable Shadow PSR is sent in response.

ret: the emulation 101-1 is completed.

Through the above processing, the emulator 101-1 sets the environmental variable Shadow PSR that is treated as the PSR 211 by User OS#1, thereby seemingly executing the PSR operation instruction which in this example is a privileged operation exception instruction for User OS# 1 in place of User OS#1. In the case where Shadow PSR. i is reset, physical interruptions occur but the hypervisor 10 accepts all interruptions and exceptions once and does not notify the user OSs. It therefore seems to User OS#1 like the same effect as when the physical register PSR. i is reset is brought by the control.

The description given here is about a case of the interruption prohibition instruction. Irrespective of the type of the instruction, whenever an instruction issued from one of User OS#0 to User OS#n influences another user OS, the emulator 101 emulates the operation by setting the value of a variable as described above instead of the physical register.

As has been described, all it takes for the hypervisor 10 to deal with a privileged operation exception (exceptional processing of the CPUs) or an interruption is to copy a related page of a user OS, replace an instruction in question with a CALL instruction to call up the emulator 101, and move the instruction execution location to a location to where the page is copied. Accordingly, an overhead resulting from processing a privileged operation exception or an interruption is significantly reduced, and the processing speed of the hypervisor 10 is enhanced greatly.

The processing speed of the hypervisor 10 is enhanced also by another feature of this embodiment that, once a privileged operation exception or an interruption occurs, activating the emulator 101 allows no other privileged operation exceptions to occur.

This invention has a remarkable effect of greatly cutting an overhead resulting from processing a privileged operation exception or an interruption since the hypervisor 10 of this invention does not need to choose, after binary translation, the instruction to be executed, unlike the prior art example.

Furthermore, the instruction replacing takes place on a page basis when a page is copied to the hypervisor's allocated area Vmh, which makes this invention widely applicable regardless of the type of User OS#0 to User OS#n.

Second Embodiment

Figure 9:
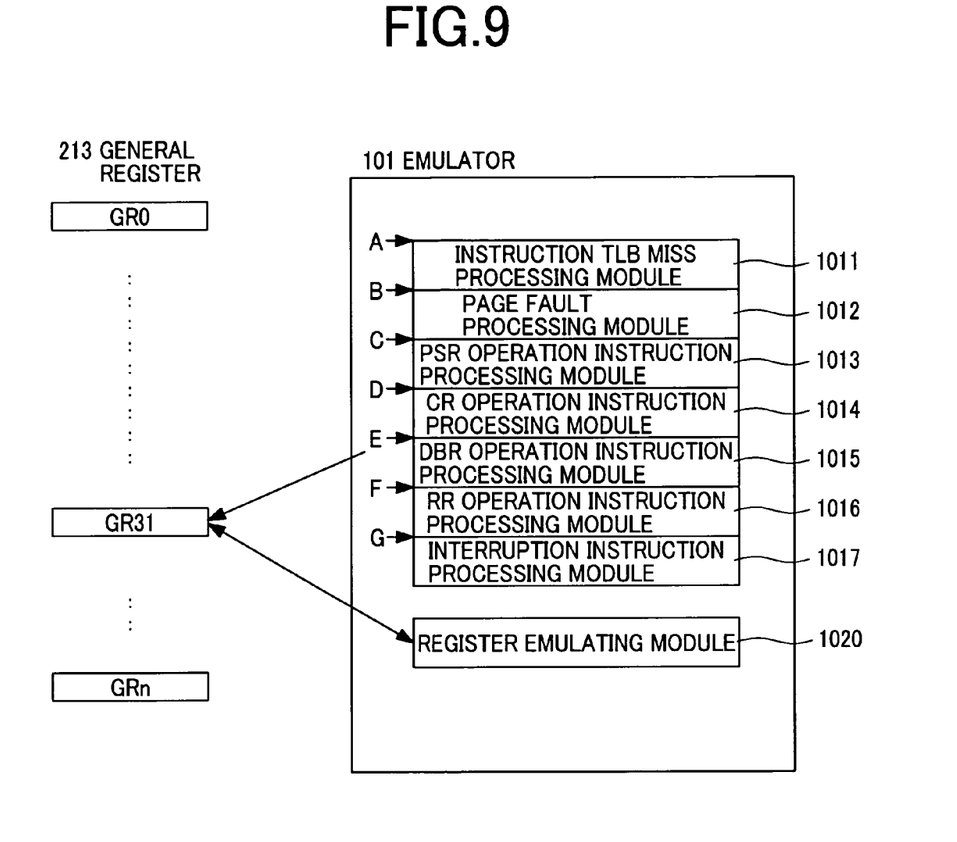
FIG. 9 is a block diagram of an emulator according to a second embodiment.
Figure 10:
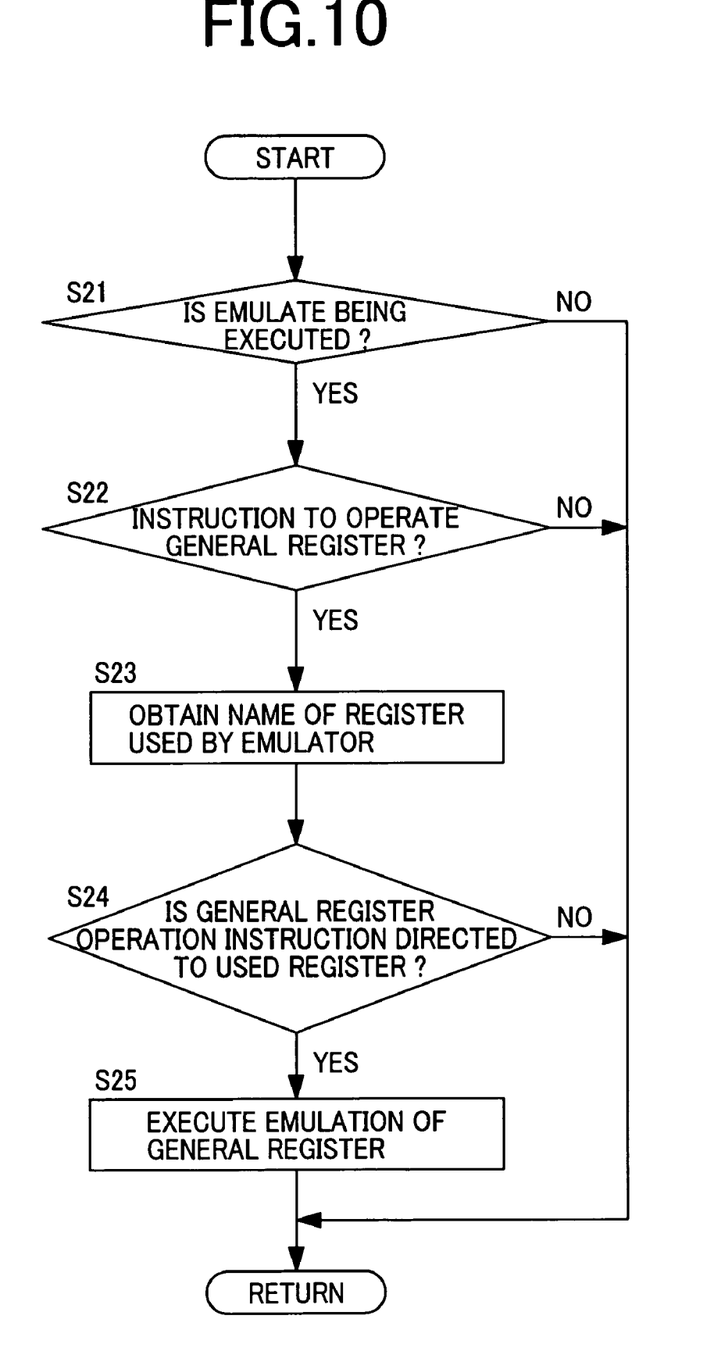
FIG. 10 is a flow chart showing an example of emulation processing that is executed by a hypervisor according to the second embodiment.

FIGS. 9 and 10 show a second embodiment, where a register emulating module 1020 which emulates operation of a general register is added to the emulator 101 of the first embodiment described above.

Depending on the architecture of the CPUs 201-0 to 201-3, at least one general register 213 may have to be set aside for execution of the emulator 101 (for example, the IA-64 architecture). When the CPUs 201-0 to 201-3 employed are of this type, the hypervisor 10 secures the general register 213 before executing the emulator 101. A competition for a hardware resource has to be avoided in the case where other components such as User OS#0 to User OS#n issue an instruction to operate the secured general register 213 while the emulator 101 is being executed.

To avoid the competition, the register emulating module 1020 which emulates the general register 213 is provided in the emulator 101 of the hypervisor 10 as shown in FIG. 9. In the case where other components such as User OS#0 to User OS#n attempt to operate the secured general register 213 while the emulator 101 is being executed, the currently executed emulator is evacuated to the hypervisor's allocated area Vmh or other areas, and the instruction to operate this general register 213 is executed by the emulator 101. After the instruction issued to operate the secured general register 213 by other components such as User OS#0 to User OS#n is completed, the emulation data that has been evacuated is moved back to the secured general register 213 to resume execution of the emulator 101.

An example of how the hypervisor 10 executes the processing of emulating the general register 213 will be described with reference to a flow chart of FIG. 10. This processing is executed by the hypervisor 10 in regular cycles.

In a step S21, the hypervisor 10 judges whether or not any one of the emulators 101-0 to 101-n is being executed. In the case where one or more of the emulators 101-0 to 101-n are being executed, the processing moves to a step S22. In the case where none of the emulators 101-0 to 101-n is being executed, the processing is immediately terminated.

In the step S22, the hypervisor 10 judges whether or not User OS#0 to User OS#n or the like has requested to operate the general register 213.

When there is a request to operate the general register 213, the processing moves to a step S23. When there is no such request, the processing is terminated.

In the step S23, the hypervisor 10 obtains the name of each general register 213 that is being used by the currently executed emulators 101-0 to 101-n. In a step S24, the hypervisor 10 judges whether or not the name of the general register 213 that is being used by the emulators 101-0 to 101-n matches the name of the requested general register 213. When there is a match, the processing advances to a step S25, where the hypervisor 10 executes emulation of the general register 213 in the emulators 101-0 to 101-n that are using the general register 213 whose name matches the requested general register 213.

For instance, while the emulator 101 is using a general register GR31 in FIG. 9, other components such as User OS#0 to User OS#n issue an instruction to use this general register GR31. Then the hypervisor 10 follows the procedure described above with reference to FIG. 10 to identify the emulator 101 that is using the general register GR31.

The hypervisor 10 moves data in the general register GR31 to a free area within the hypervisor's allocated area Vmh or other areas for temporary evacuation as described above. Thereafter, the register emulating module 1020 is activated to operate the general register GR31 as requested by other components such as User OS#0 to User OS#n. After the requested operation is finished, the data that has been evacuated is returned to the general register GR31, and the emulation by the emulator 101 is resumed.

As has been described, in the case where the employed CPUs 201-0 to 201-3 are of the type that necessitates setting aside the general register 213 for execution of the emulator 101, the hypervisor 10 deals with a request to operate a specific register that is being used by the emulator 101 for processing of a privileged operation exception or an interruption by emulating this operation request. A competition for a hardware resource is thus avoided and logical partitioning is smoothly executed.

FIRST MODIFICATION EXAMPLE

Figure 11:
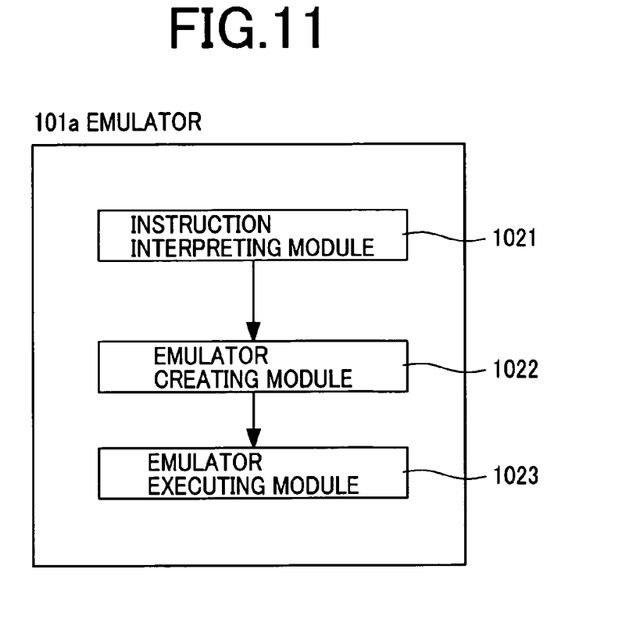
FIG. 11 is a block diagram of an emulator according to a first modification example.

FIG. 11 illustrates a modification example of the emulator shown in the first embodiment. An emulator 101a is composed of an instruction interpreting module 1021, which interprets which of preset instructions matches an emulation subject instruction, an emulator creating module 1022, which creates in a free area within the hypervisor's allocated area Vmh or other areas an emulator for the instruction specified by the instruction interpreting module 1021, and an emulation executing module 1023, which executes the emulation subject instruction with the created emulator.

As the hypervisor 10 obtains an emulation subject instruction, the emulator 101a creates in the hypervisor's allocated area Vmh an emulator suited to the obtained instruction, and executes emulation. The emulator created here is one chosen as suitable for the specified instruction out of the processing modules 1011 to 1017 shown in FIG. 4.

In this first modification example, the hypervisor's allocated area Vmh does not need to store the processing modules 1011 to 1017 prepared to process all types of emulation subject instruction unlike the emulator 101 of the first embodiment, and the virtual address space can therefore be utilized effectively.

When the LPAR count is high, in particular, the emulator 101a which creates an emulator in the hypervisor's allocated area Vmh only when needed is effective in expanding a portion of the virtual address space that is allocated to the LPARs provided to users, since the hypervisor 10 needs as many emulators as User OS#0 to User OS#n running on the LPARs.

SECOND MODIFICATION EXAMPLE

Figure 12:
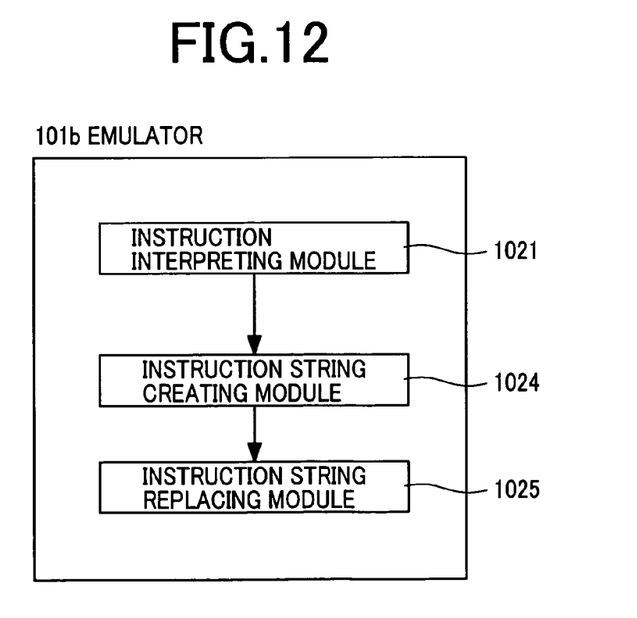
FIG. 12 is a block diagram of an emulator according to a second modification example.

FIG. 12 illustrates another modification example of the emulator shown in the first embodiment. An emulator 101b is composed of the instruction interpreting module 1021, which interprets which of preset instructions matches an emulation subject instruction, an instruction string creating module 1024, which creates an instruction string as a substitute for the instruction specified by the instruction interpreting module 1021, and an instruction string replacing module 1025, which replaces the emulation subject instruction copied to the hypervisor's allocated area Vmh with the created instruction string.

As the hypervisor 10 obtains an emulation subject instruction, the emulator 101b creates an instruction string corresponding to the obtained instruction. Then the emulator 101b replaces the emulation subject instruction copied to the hypervisor's allocated area Vmh with the created instruction string and executes the instruction string.

For instance, in the case where the obtained emulation subject instruction is the instruction to operate the PSR 214 which is shown in FIG. 8, the emulator 101b creates the instruction string of the emulator 101-1 shown in FIG. 8. The created instruction string is inserted at a point in the hypervisor's allocated area Vmh where the emulation subject instruction is copied.

Also in this second modification example, the hypervisor's allocated area Vmh does not need to store the processing modules 1011 to 1017 prepared to process all types of emulation subject instruction unlike the emulator 101 of the first embodiment, and the virtual address space can therefore be utilized effectively.

The above embodiments and modification examples describe a case of dealing with privileged operation exceptions or interruptions from the CPUs 201-0 to 201-3. However, exceptions or interruptions from the bridge chip 203 and the I/O interface 207 or from the I/O devices can also be received by the hypervisor 10 and emulated by the emulators 101-0 to 101-n.

The above embodiments and modification examples show an example of changing the instruction execution location of the CPUs 201-0 to 201-3 by operating the instruction TLB 211. However, an instruction can be replaced with an optimum instruction in accordance with the architecture of the CPUs 201-0 to 201-3. For instance, in the case where the instruction execution location is pointed by an instruction pointer, the instruction pointer may directly or indirectly be operated such that the copied page P2 in the hypervisor's allocated area Vmh is executed.

As has been described, according to this invention, the emulator processes a specific hardware resource in place of User OS#0 to User OS#n when the need to process a privileged operation exception or an interruption arises in User OS#0 to User OS#n. Therefore, this invention is applicable to a virtual computer system that has excellent stability and processing speed.

While the present invention has been described in detail and pictorially in the accompanying drawings, the present invention is not limited to such detail but covers various obvious modifications and equivalent arrangements, which fall within the purview of the appended claims.

What is claimed is:

1. A computer-readable storage medium storing a program product for a virtual computer that partitions a physical computer through a hypervisor into a plurality of logical partitions and runs an OS on each of the logical partitions, the program product causing the physical computer to execute the procedures of:

detecting an exception or an interruption in the physical computer;

identifying an OS on a logical partition where the detected exception or interruption has occurred;

copying a first storage area that contains an instruction string including a privileged instruction that is the subject of the exception or interruption from a storage space allocated to the identified OS into a second storage area within a storage space allocated to use of the hypervisor;

replacing, in the second storage area, the privileged instruction included in the instruction string copied to the second storage area with a non-privileged instruction that substitutes for the privileged instruction; and moving a location where the physical computer executes an instruction to a location of the second storage area by using an address translation mechanism in a physical CPU so that the non-privileged instruction is executed by the physical computer instead of the privileged instruction.

2. The computer-readable storage medium according to claim 1, wherein the procedure of replacing the privileged instruction includes the procedures of:

setting, in the storage space allocated to use of the hypervisor, an emulator that emulates a behavior of the privileged instruction causing the exception or interruption; and wherein the non-privileged instruction that substitutes for the privileged instruction is a CALL instruction to call up the emulator.

3. The computer-readable storage medium according to claim 1, further including the procedure of previously placing, in the storage space allocated to use of the hypervisor, an emulator that has processing modules for each type of privileged instructions causing exception or interruption to emulate a behavior of the each type of the privileged instructions in place of the identified OS, and wherein the non-privileged instruction is a CALL instruction for calling up a processing module, which is associated with the privileged instruction causing the detected exception or interruption, among the processing modules which are respectively associated with different types of the instruction.

4. The computer-readable storage medium according to claim 2, wherein the procedure of setting the emulator includes the procedure of:

creating the emulator that emulates a behavior of the privileged instruction causing the exception or interruption.

5. The computer-readable storage medium according to claim 2, wherein, if an instruction, which operates a specific register of a CPU that constitutes the physical computer, is issued by an OS other than the identified OS while emulating the behavior of the privileged instruction by the emulator, the emulator executes the instruction to operate the specific register in place of the OS other than the identified OS.

6. The computer-readable storage medium according to claim 5, wherein the specific register is a register that is being used by the emulator.

7. The computer-readable storage medium according to claim 1, wherein the procedure of replacing includes the procedures of:

creating an instruction string that substitutes for the privileged instruction causing the exception or interruption; and replacing, in the second storage area, the privileged instruction with the created instruction string as the non-privileged instruction that substitutes for the privileged instruction.

8. The computer-readable storage medium according to claim 1,
   wherein the hypervisor has a page table, which manages a physical address space of a memory in the physical computer as pages having a predetermined size as a unit, and which sets the association relation between pages of the physical address space and pages of a virtual address space, and
   wherein, in the procedure of copying, a page containing the privileged instruction causing the exception or interruption is copied as the first storage area.

9. The computer readable storage medium according to claim 1, wherein, in the procedure of detecting, exceptions or interruptions caused by predetermined privileged instructions that are to be emulated are detected.

10. A method for controlling a virtual computer that partitions a physical computer into a plurality of logical partitions through a hypervisor and runs an OS on each of the logical partitions, comprising the steps of:
   detecting an exception or an interruption occurring in the physical computer;
   identifying an OS on a logical partition where the detected exception or interruption has occurred;
   copying a first storage area that contains an instruction string including a privileged instruction that is the subject of the exception or interruption from a storage space allocated to the identified OS into a second storage area within a storage space allocated to use of the hypervisor;
   replacing, in the second storage area, the privileged instruction included in the instruction string copied to the second storage area with a non-privileged instruction that substitutes for the privileged instruction; and
   moving a location where the physical computer executes an instruction to a location of the second storage area by using an address translation mechanism in a physical CPU so that the non-privileged instruction is executed by the physical computer instead of the privileged instruction.

11. The method for controlling a virtual computer according to claim 10, wherein the step of replacing the privileged instruction includes the step of:
   setting, in the storage space allocated to use of the hypervisor, an emulator that emulates a behavior of the privileged instruction causing the exception or interruption;
   wherein the non-privileged instruction that substitutes for the privileged instruction is a CALL instruction to call up the emulator.

12. The method for controlling a virtual computer according to claim 10,
   further including the step of previously placing, in the storage space allocated to use of the hypervisor, an emulator that has processing modules for each type of privileged instructions causing exception or interruption in place of the identified OS, and
   wherein the non-privileged instruction is a CALL instruction for calling up a processing module, which is associated with the privileged instruction causing the detected exception or interruption, among the processing modules which are respectively associated with different types of the instruction.

13. The method for controlling a virtual computer according to claim 11, wherein the step of setting the emulator includes the step of:
   creating the emulator that emulates a behavior of the privileged instruction causing the exception or interruption.

14. The method for controlling a virtual computer according to claim 10, wherein the step of replacing includes the steps of:
   creating an instruction string that substitutes for the privileged instruction causing exception or interruption; and
   replacing, in the second storage area, the privileged instruction with the created instruction string the non-privileged instruction that substitutes for the privileged instruction.

15. The method for controlling a virtual computer according to claim 10,
   wherein the hypervisor has a page table, which manages a physical address space of a memory in the physical computer and pages having a predetermined size as a unit, and which sets the association relation between pages of the physical address space and pages of a virtual address space, and
   wherein, in the step of copying, a page containing the privileged instruction causing the exception or interruption is copied as the first storage area.

16. The method for controlling a virtual computer according to claim 10, wherein, in the step of detecting, an exception or an interruption caused by a predetermined privileged instruction that is to be emulated is detected.

17. The method for controlling a virtual computer according to claim 10, wherein if an instruction, which operates a specific register of a CPU that constitutes the physical computer, is issued by an OS other than the identified OS while emulating the behavior of the privileged instruction by the emulator, the emulator executes the instruction to operate the specific register in place of the OS other than the identified OS.

18. The method for controlling a virtual computer according to claim 17, wherein the specific register is a register that is being used by the emulator.

* * * * *